United States Patent [19]

Kolev et al.

[11] Patent Number: 5,884,168
[45] Date of Patent: Mar. 16, 1999

[54] MULTIPLE CELLULAR SYSTEMS WITH LIMITED SIM CARD INFORMATION

[75] Inventors: Javor Kolev, Durham; Carsten Hoirup, Raleigh, both of N.C.

[73] Assignee: Ericsson, Inc., Research Triangle Park, N.C.

[21] Appl. No.: 705,239

[22] Filed: Aug. 30, 1996

[51] Int. Cl.$^6$ ..................................................... H04B 1/40
[52] U.S. Cl. .......................... 455/432; 455/551; 455/552; 455/558; 455/186.1
[58] Field of Search ..................................... 455/426, 434, 455/435, 463, 551, 552, 553, 557, 558, 186.1, 422, 432

[56] References Cited

U.S. PATENT DOCUMENTS

| | | | |
|---|---|---|---|
| 4,887,311 | 12/1989 | Garner et al. | 455/186.1 |
| 5,448,765 | 9/1995 | Kovanen et al. | 455/558 |
| 5,586,166 | 12/1996 | Turban | 455/558 |

OTHER PUBLICATIONS

A. Charbonnier, et al., "Perspectives for Mobile Communications," Commutation et Transmission vol. 15 (Jan. 1993): pp. 109–121.

G. Mazziotto, "The Subscriber Identity Module for the European Digital Cellular System GSM," Proceedings of the Nordic Seminar on Digital Land Mobile Radio Communications (DMR) Jun. 26–28 1990, pp. 1–9.

*Primary Examiner*—Reinhard J. Eisenzopf
*Assistant Examiner*—Lester G. Kincaid
*Attorney, Agent, or Firm*—Jenkens & Gilchrist, P.C.

[57] ABSTRACT

A multi-mode mobile station receives a subscriber identity module (SIM) card storing at least certain communications standard required subscription information that is common to a plurality of types of cellular telecommunications systems. The mobile station also includes an internal memory for storing communications standard required subscription information unique to each type of cellular telecommunications systems for which mobile station operations are supported. If a certain type of cellular telecommunications system is selected for mobile station operation, and the inserted SIM card fails to include the necessary communications standard required subscription information for that type of system, the common information is extracted from the SIM card and used in combination with the internal memory stored unique information specific to the selected type of system in effectuating mobile station operation.

10 Claims, 4 Drawing Sheets

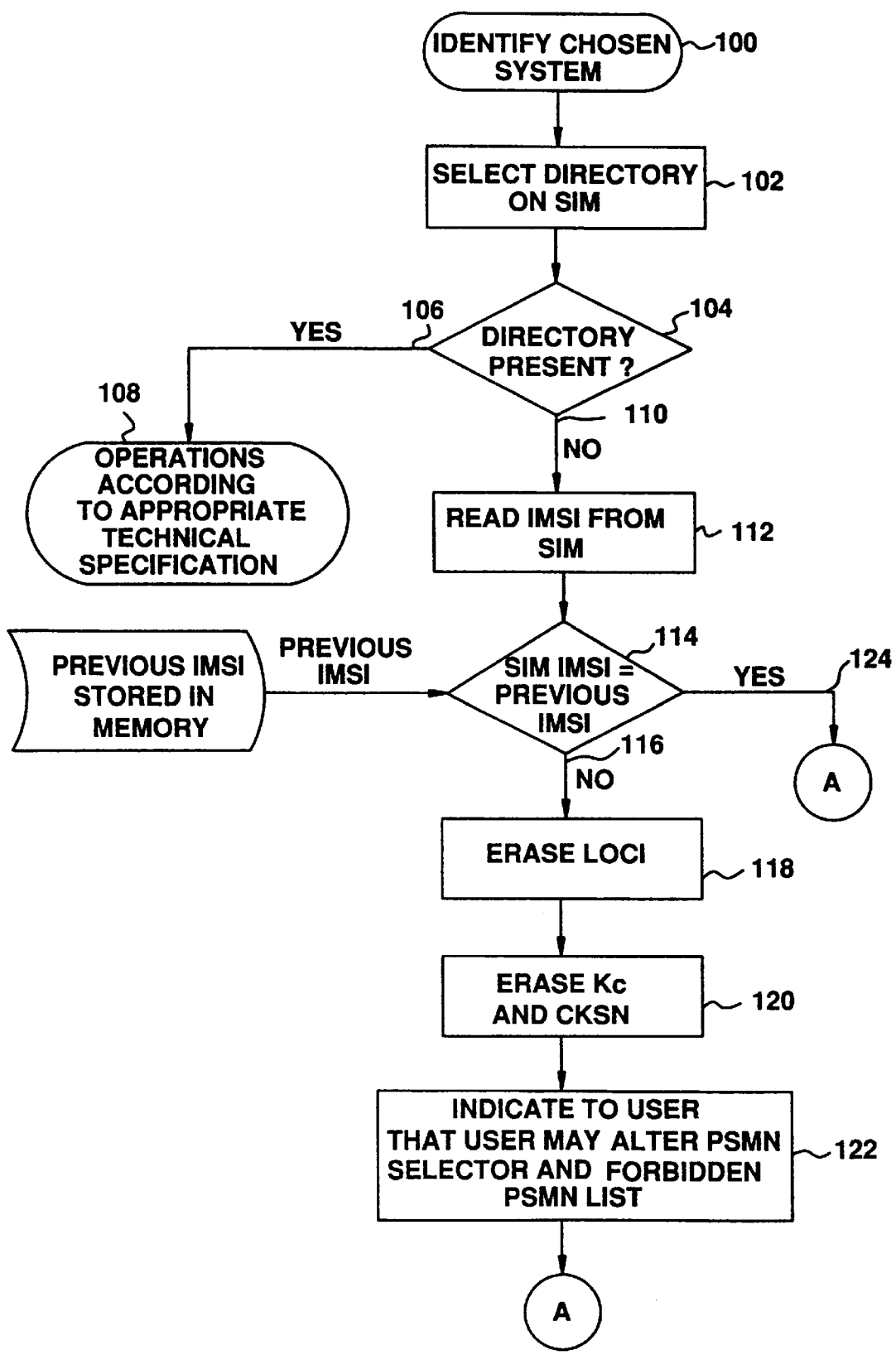

MULTIPLE CELLULAR SYSTEMS WITH LIMITED SIM CARD INFORMATION

BACKGROUND OF THE INVENTION

1. Technical Field of the Invention

The present invention relates to multi-mode mobile stations operable within a telecommunications system and, in particular, to a multi-mode mobile station operable within a selected one of two or more different types of cellular telecommunications systems in instances where an inserted subscriber identity module (SIM) card includes complete communications standard required subscription information pertinent to non-selected ones of the supported types of cellular telecommunications systems.

2. Description of Related Art

Terrestrial cellular telecommunications systems are now commonly available for subscriber use in most of the major urban areas of the world. However, in spite of the success of such systems and the increasing demand for expanded coverage, there remain areas of the world where terrestrial cellular telecommunications systems do not present a commercially or economically viable communications option. For example, rural areas with low population densities do not offer a substantial enough potential subscriber base to justify the cost of installing a terrestrial cellular telecommunications system infrastructure. Notably, these rural areas sometimes lack conventional wireline (fixed) telephone service as well for the same economic reasons.

There also exist capacity concerns with respect to existing terrestrial cellular telecommunications systems. The dramatic success and acceptance of this form of telecommunications has led to increased subscription growth. With more and more users, some existing terrestrial cellular telecommunications systems have become overloaded during peak use times. While the demand justifying expansion is present, some service providers have been slow to respond by making improvements to and authorizing the expansion of the existing infrastructure. In some instances, governmental restrictions have further hampered effective service provider response to increases in demand.

The foregoing concerns have contributed towards the development of satellite cellular telecommunications systems. Such systems rely on communications satellites placed in orbit above the surface of the earth to relay telephonic communications between mobile stations (also referred to as "user terminals") and conventional terrestrial cellular and wireline telecommunications systems. The primary benefit, from both a service and cost perspective, provided by a satellite cellular telecommunications system is that a single satellite is capable of servicing the telecommunications needs of many users distributed over a substantial service area including both rural and urban areas. In fact, one satellite may be capable of providing telecommunications service throughout an entire country. Satellites are further capable of providing telecommunications service in areas of the world (like the ocean surface and remote mountain ranges) where installation of conventional terrestrial cellular and wireline telecommunications system infrastructure is difficult if not impossible.

It is well known that the terrestrial cellular telecommunications system and the satellite cellular telecommunications system operate in accordance with different communications standards. Furthermore, many different types of terrestrial cellular telecommunications systems exist, again each operating in accordance with different communications standards. Thus, for example, a subscriber wishing to access and use the Asia Cellular Satellite (ACeS) type satellite cellular telecommunications system must possess and utilize a mobile station configured for operation in accordance with the ACeS communications standard. If that same subscriber wanted to access and use the Global System for Mobile (GSM) communications type terrestrial cellular telecommunications system, their mobile station must be configured for operation in accordance with the GSM communications standard. Similarly, the mobile station must be appropriately configured for operation in any other desired terrestrial or satellite cellular telecommunications system (such as, an I-CO type satellite cellular telecommunications system, or the Advanced Mobile Phone System (AMPS or D-AMPS) type or Personal Communications System (PCS) type terrestrial cellular telecommunications systems).

Recent developments in mobile station design have made multi-mode mobile stations available for subscriber use. Such multi-mode devices are capable of being configured for operation in any selected one of two or more available cellular telecommunications system types. For example, the mobile station may be terrestrial system oriented and configured for operation in one mode in accordance with the GSM communications standard, and in another mode in accordance with the PCS communications standard. With the advent of satellite cellular telecommunications systems, increasing numbers of mobile stations are capable of operation in one of the terrestrial cellular telecommunications systems, such as GSM, and one of the satellite cellular telecommunications systems, such as ACeS. Access to such a mobile station, in conjunction with the placement into operation of both terrestrial and satellite cellular telecommunications systems, advantageously provides the subscriber with access to telecommunications services substantially throughout the entire world.

The communications standard required subscription information necessary for specifying proper multi-mode mobile station operation in one of several available types of terrestrial or satellite cellular telecommunications systems is conventionally stored in a subscriber identity module (SIM) card which is inserted into the mobile station. Beyond being a central store of subscriber information, the primary advantage provided by the SIM card is that a subscriber and his or her subscription are no longer tied (or assigned) to a particular mobile station. The subscriber instead may insert their personal SIM card into any SIM supporting mobile station and immediately have access to their subscription to make and receive cellular telephone calls.

Instances are likely to occur where a multi-mode mobile station is capable of operation in a particular type of terrestrial or satellite cellular telecommunications system, and the subscriber in fact desires to communicate over that particular system, but the inserted SIM card does not include the particular communications standard required subscription information necessary for specifying proper multi-mode mobile station operation in that system. For example, the multi-mode mobile station may be capable of operation in both the ACeS type satellite cellular telecommunications system and the GSM type terrestrial cellular telecommunications system. However, the inserted subscriber SIM card may include communications standard required subscription information relating only to operation in accordance with the GSM type terrestrial cellular telecommunications system. Certain ACeS communications standard subscription information is missing from, or has no equivalent in, the available GSM communications standard required subscription information. Accordingly, if no GSM type terrestrial cellular telecommunications system is available to the subscriber at a given location, and even though the ACeS type satellite cellular telecommunications system is available for mobile station access, the failure of the SIM card to include the ACeS communications standard required subscription information would preclude mobile station operation over that satellite cellular telecommunications system.

There is a need then for a multi-mode mobile station to support full multi-mode operation over and access to various types of terrestrial and satellite cellular telecommunications systems even in those instances where a subscriber inserted SIM card fails to include the terrestrial and satellite communications standard required subscription information necessary for such operation.

SUMMARY OF THE INVENTION

To address the need described above, a multi-mode mobile station of the present invention capable of operation in both a first and a second type of cellular telecommunications system includes a slot for receiving a subscriber identity module (SIM) card which stores at least certain communications standard required subscription information that is common to both the first and second types of cellular telecommunications systems. By common, it is meant that communications standard required subscription information which is identical or equivalent in each system. The mobile station further includes an internal memory for storing that communications standard required subscription information that is uncommon to both the first and second types of cellular telecommunications systems. By uncommon, it is meant that communications standard required subscription information which is unique to each system. In instances where an inserted SIM card does not include sufficient communications standard required subscription information to support mobile station operation in a desired type of cellular telecommunications system, the uncommon, unique communications standard required subscription information missing from the SIM card is instead read from the internal memory for use with the SIM card stored common information in engaging in cellular communications.

BRIEF DESCRIPTION OF THE DRAWINGS

A more complete understanding of the method and apparatus of the present invention may be obtained by reference to the following Detailed Description when taken in conjunction with the accompanying Drawings wherein:

FIGS. 4A and 4B are a flow diagram illustrating operation of the mobile station in accordance with the present invention.

DETAILED DESCRIPTION OF THE DRAWINGS

Figure 1:
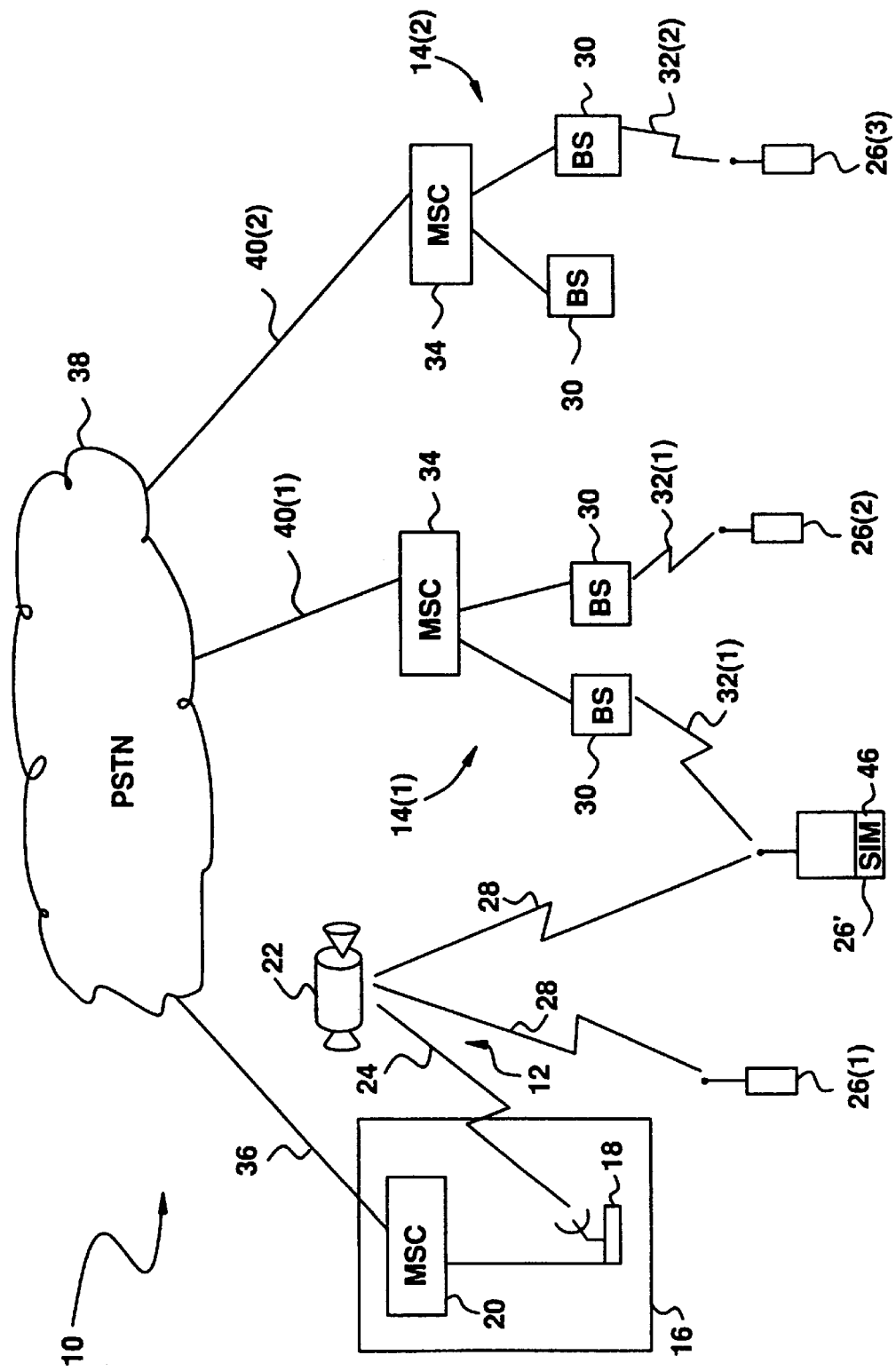
FIG. 1 is a block diagram of a telecommunications system including a satellite cellular telecommunications system and plural terrestrial cellular telecommunications systems.

Reference is now made to FIG. 1 wherein there is shown a block diagram of a telecommunications system 10 including a satellite cellular telecommunications system 12 and plural terrestrial cellular telecommunications systems 14(1) and 14(2). The satellite cellular telecommunications system 12 includes a plurality of interconnected satellite access nodes 16 (only one shown). Each satellite access node 16 comprises a land earth station (LES) 18 connected to a mobile switching center (MSC) 20. The satellite cellular telecommunications system 12 further includes a plurality of satellite transceivers 22 (only one shown) positioned in orbit above the surface of the earth. The land earth station 18 communicates with the satellite transceiver 22 via a radio frequency communications link 24. The satellite transceiver 22 communicates with mobile stations 26(1) (only one shown) over a radio frequency communications link 28. The satellite transceiver 22 accordingly functions to relay telephone communications (and related control signals) between the land earth station 18 and the mobile stations 26(1) over the communications links 24 and 28. The mobile switching center 20 switches within the satellite cellular telecommunications system 12, and with other portions of the telecommunications system 10, telephone calls originated by or terminated at the mobile stations 26(1). Operation of the satellite cellular telecommunications system 12 in this fashion is well known to those skilled in the art, and thus further description will not be provided.

Each of the terrestrial cellular telecommunications systems 14(1) and 14(2) includes a plurality of base stations (BS) 30 (only two shown) for transmitting telephone communications (and related control signals) with mobile stations 26(2) and 26(3) (only one shown per system) over a radio frequency communications link 32(1) and 32(2), respectively. Each base station 30 is connected through a mobile switching center (MSC) 34 to other mobile switching centers (not shown) within the cellular telecommunications system 14. The mobile switching centers 34 switch within their respective terrestrial cellular telecommunications systems 14, and with other portions of the telecommunications system 10, telephone calls originated by or terminated at the mobile stations 26(2) and 26(3). Operation of the terrestrial cellular telecommunications systems 14 in this fashion is well known to those skilled in the art, and thus further description will not be provided.

The mobile switching center 20 of each satellite access node 16 for the satellite cellular telecommunications system 12 is connected by a communications link 36 to a fixed telephone network 38 (comprising a public switched telephone network (PSTN) or other equivalent telephone network). Similarly, at least one of the mobile switching centers 34 for each of the terrestrial cellular telecommunications systems 14(1) and 14(2) is connected by a communications link 40(1) and 40(2), respectively, to the fixed telephone network 38. Operation of the mobile switching centers 20 and 34 thus also encompasses the switching of telephone calls originated by or terminated at the mobile stations 26(1), 26(2) and 26(3) through the fixed telephone network 38.

While each terrestrial cellular telecommunications system 14(1) and 14(2) is illustrated as having only two base stations 30, it will, of course, be understood that such systems would typically include many more base stations, and that the depiction of only two base stations is to be taken as an illustration of, rather than a limitation on, the operation of the present invention. It will further be understood that although only one mobile switching center 34 is shown to simplify the illustration each terrestrial cellular telecommunications system 14(1) and 14(2), it will be understood that such systems typically will include many mobile switching centers interconnected to each other (perhaps through the fixed telephone network 38), with each mobile switching center being connected to a plurality of base stations 30. Finally, communications systems 10 typically include far more than a few mobile stations 26 operating therein at any one time. The depiction of a few mobile stations 26 then is to be taken as an illustration of, rather than a limitation on, the operation of the present invention.

The satellite cellular telecommunications system 12 and the terrestrial cellular telecommunications systems 14(1) and 14(2) each operate in accordance with different communications standards, with each such standard requiring mobile station 26 use of and access to certain associated subscription information. Typically, mobile stations 26 (like mobile station 26(1), 26(2) and 26(3)) are pre-programmed with communications standard required subscription information relating to only one particular type of cellular telecommunications system. For example, the mobile station 26(2) may be programmed with only first terrestrial cellular telecommunications system 14(1) communications standard required subscription information. That mobile station 26(2) is then configured for and restricted to operation only within the first terrestrial cellular telecommunications system 14(1). It is not possible to operate a mobile station 26 in a given satellite or terrestrial cellular telecommunications system 12, 14(1) or 14(2) when the appropriate communications standard required subscription information is not available for mobile station access and use.

Recent developments in mobile station design have made multi-mode mobile stations 26' available for subscriber use. Such multi-mode devices are capable of being configured for operation in any selected one of two or more types of cellular telecommunications systems. For example, the mobile station 26' may be terrestrial system oriented and be configured for operation in one mode for use in the first terrestrial cellular telecommunications system 14(1), and in another mode for use in the second terrestrial cellular telecommunications system 14(2). Alternatively, the mobile station 26' may be both satellite and terrestrial system oriented (as shown) and be configured for operation in one mode for use in the satellite cellular telecommunications system 12, and in another mode for use in the first terrestrial cellular telecommunications system 14(1). In any such case, the multi-mode mobile station 26' must have access to the communications standard required subscription information for each system 12, 14(1) or 14(2) in which operation is desired.

Unlike conventional mobile stations (like the mobile station 26(1), 26(2) and 26(3)), no mobile station pre-programming occurs with respect to the communications standard required subscription information necessary for proper multi-mode mobile station 26' operation in a selected one or ones of several available types of terrestrial or satellite cellular telecommunications systems 12, 14(1) or 14(2). Rather, the communications standard required subscription information is instead stored in and accessed by the mobile station 26' from a subscriber identity module (SIM) card 46 which is owned by the subscriber and inserted into the mobile station. The primary advantage of SIM card 46 use is that subscribers are no longer tied or restricted to use only one particular mobile station. The subscriber instead may carry their SIM card 46 with them while traveling, and then access their subscription and make and receive cellular calls using any SIM card compatible mobile station or telephone.

Figure 2:
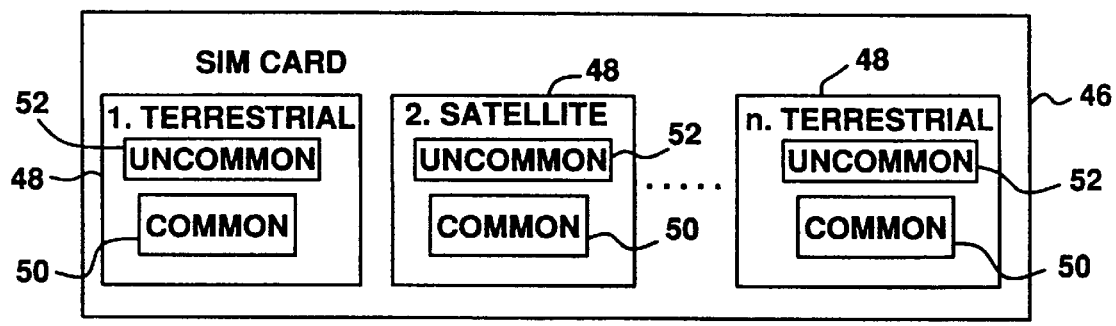
FIG. 2 is a directory diagram for a conventional subscriber identity module (SIM) card.

Reference is now made to FIG. 2 wherein there is shown a directory diagram for a conventional SIM card 46. The SIM card 46 includes a directory 48 storing communications standard required subscription information for each satellite or terrestrial cellular telecommunications system 12, 14(1) or 14(2) to which the subscriber owning the SIM card has a subscription. When operation in a given one of the satellite or terrestrial cellular telecommunications systems 12, 14(1) or 14(2) supported by the multi-mode mobile station 26' is desired, the appropriate communications standard required subscription information for that system is extracted by the mobile station from the SIM card 46. Unfortunately, however, operation within the given satellite or terrestrial cellular telecommunications system 12, 14(1) or 14(2) is not possible if the SIM card 46 fails to include the appropriate associated directory 48.

The information contained within each directory 48 of a conventional SIM card 46 is well known to those skilled in the art. It is noted from a review of this information that a certain portion 50 of the included communications standard required subscription information is common to each directory 48. By common, it is meant that the communications standard required subscription information at issue in one directory 48 is identical or generally equivalent to subscription information in each of the other included directories. It follows then that the remaining portions 52 of the included communications standard required subscription information is uncommon among the directories 48. By uncommon, it is meant that the communications standard required subscription information now at issue in each directory 48 is either unique to that directory and/or has no equivalent in the other directories.

It is recognized that the mobile station 26' must have access to and utilize the appropriate communications standard required subscription information for the cellular telecommunications system over which cellular communications are desired. Instances do, however, arise where the subscriber inserted SIM card 46 fails to include a directory 48 containing the communications standard required subscription information for the desired cellular telecommunications system. In such cases, the inability of the mobile station 28' to extract appropriate communications standard required subscription information from the SIM card 46 precludes operation in the desired cellular telecommunications system.

Figure 3:
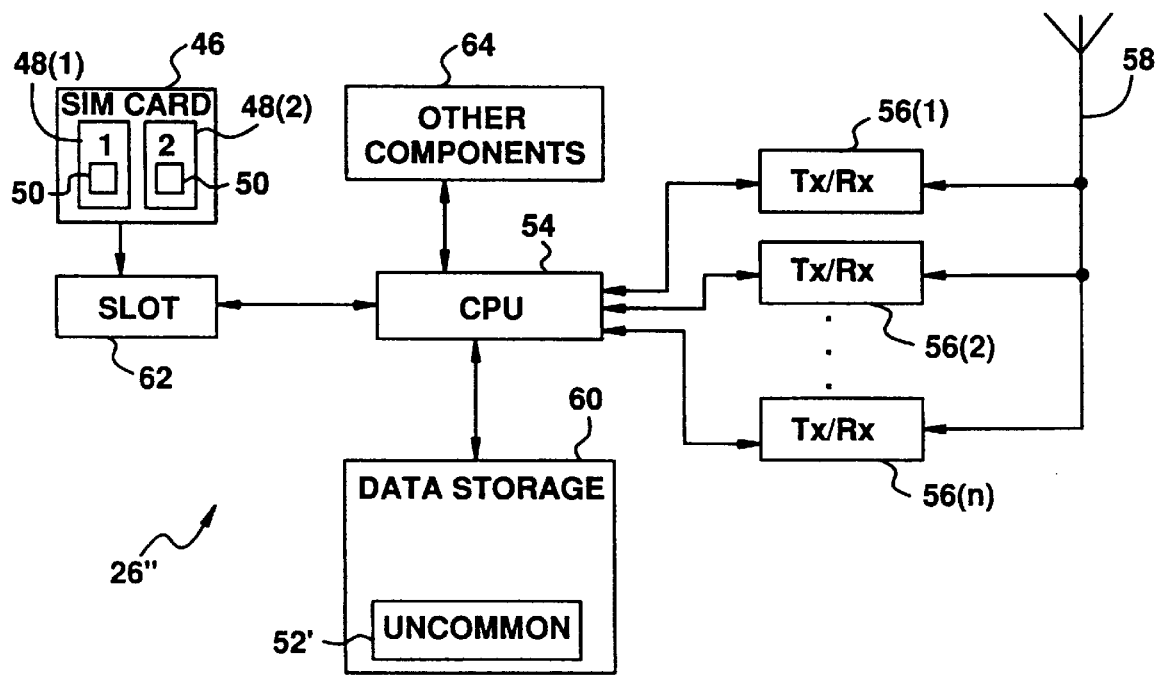
FIG. 3 is a block diagram of a multi-mode mobile station in accordance with the present invention.

Reference is now made to FIG. 3 wherein there is shown a block diagram of a multi-mode mobile station 26" in accordance with the present invention. The mobile station 26" includes a processor (CPU) 54 connected to a plurality of transceivers 56. The transceivers 56 are each configured to operate in the frequency bands and channels of a different cellular telecommunications system. By means of an output signal from the processor 54, the precise channel on which each of the transceivers 56 operate for communications may be selected. An antenna 58 is connected to the transceivers 56 for transmitting and receiving radio communications (both voice and data) over the telecommunications system 10 utilizing, for example, the satellite transceivers 22 and base stations 30 of FIG. 1. A data storage device 60 (preferably in the form of a semi-permanent memory) is also connected to the processor 54. The data storage device 60 is used for storing programs and data executed by the processor 54 in controlling operation of the mobile station 26". The mobile station 26" further includes a SIM card slot 62 connected to the processor 54. It is through the SIM card slot 62 that the processor 54 communicates with a subscriber inserted SIM card 46. There are other components 64 included in the mobile station 26" (like a microphone, speaker, keypad, display, etc.) and not specifically shown in FIG. 3 whose nature, operation and interconnection with the illustrated components are well known to those skilled in the art.

The data stored in the data storage device 60 includes uncommon portions 52' of communications standard required subscription information for each of the plurality of cellular telecommunications systems over which the mobile station 26" supports operation. Referring now additionally to FIG. 2, the inserted SIM card 46 remains the primary source for mobile station 26" operational information (comprising communications standard required subscription information) extracted from the directories 48. However, in instances where the SIM card 46 fails to include a directory 48 containing the communications standard required subscription information for the cellular telecommunications system over which cellular communications are desired, the mobile station 26" extracts the common portion 50 from a directory 48 included on the inserted SIM card 46, and then utilizes the uncommon portion 52' stored in its own data storage device 60 to complete the communications standard required subscription information necessary for operation over the desired cellular telecommunications system.

Operation of the mobile station 26" may be better understood by reference to a specific example. Suppose the mobile station 26" includes transceiver 56(1) functioning on multiple channels within the satellite cellular telecommunications system 12, transceiver 56(2) functioning on multiple channels within the first terrestrial cellular telecommunications system 14(1), and transceiver 56(n) functioning on multiple channels within the second terrestrial cellular telecommunications system 14(2). The data storage device 60 accordingly stores an uncommon portion 52' of the communications standard required subscription information relating to each of the supported satellite and terrestrial cellular telecommunications systems 12, 14(1) and 14(2). Now further assume that the subscriber inserted SIM card 46 includes only a first directory 48(1) containing communications standard required subscription information relating to the first terrestrial cellular telecommunications system 14(1) and a second directory 48(2) relating to some other cellular telecommunications system. If operation of the mobile station 26" is desired in the first terrestrial cellular telecommunications system 14(1), then the requisite communications standard required subscription information is simply extracted from SIM card 46 directory 48(1) in a conventional manner. If operation is instead desired in either the satellite cellular telecommunications system 12 or the second terrestrial cellular telecommunications system 14(2), the mobile station 26" recognizes the failure of the inserted SIM card 46 to include an appropriate directory 48 and the requisite information. The mobile station 26" instead extracts a common portion 50 of the information from an included directory 48(1) or 48(2) on the SIM card, and then utilizes the uncommon portion 52' of communications standard required subscription information stored on the data storage device 60 and relating to the selected one of the satellite cellular telecommunications system 12 or the second terrestrial cellular telecommunications system 14(2) to support operation over the desired system.

The distinctions and differences between common and uncommon communications standard required subscription information may be better understood by reference to a specific example. Take, for example, the SIM card 46 stored communications standard required subscription information relating to both the ACeS type satellite cellular telecommunications system and the GSM type terrestrial cellular telecommunications system. Each directory 48 is made up of a plurality of elementary files. Table 1 lists the SIM elementary file names in the first column, the contents of those files (i.e., the communications standard required subscription information) with respect to a GSM type terrestrial cellular telecommunications system in the second column, and the contents of those files with respect to an ACeS type satellite cellular telecommunications system in the third column.

TABLE 1

| SIM EF | GSM Contents, Usage | ACeS Contents, Usage |
| --- | --- | --- |
| IMSI | Subscriber Identity. | Identical to GSM |
| *LOCI | TMSI, LAI, LU Status; LAI consists of MCC, MNC, and LAC. | LAI+, TMSI, LU Status; LAI+ consists of PLMN (MCC/MNC), PSMN (SSC/SNC), LAC. |
| *Kc, Cipher Key Seq. # | Result of last ciphering session. | Kc & Cipher key seq. #, but not the same as GSM. |
| Ki | Subscriber Authentication Key. | Identical to GSM |
| *PLMN Selector | List of preferred PLMNs to select service in. | Preferred PSMN list. List of preferred PSMNs to select service in. |
| *Forbidden PLMNs | List of PLMNs NOT to select service in. | Forbidden PSMNs. List of PSMNs NOT to select for service. |
| *BCCH Table | BCCH table | S-BCCH table. Neighbor spotbeam descriptor. |
| Access Control Class | Controls access to cells. | Identical to GSM. |
| SIM Service Table | Specifies what features are available on the SIM. | Identical to GSM. |
| Language Preference | Preferred language. | Identical to GSM. |
| Accumulated Call Meter Max. | Max. value of ACM. | Separate from GSM (if ACeS uses AOC). |
| Accumulated Call Meter | Used by AOC to accumulate charge. | Separate from GSM. |
| Group ID level 1 | Used w/CUG. | Identical to GSM. |
| Group ID level 2 | Used w/CUG. | Identical to GSM. |
| *Cell Broadcast Msg. Id | Used as a filter fro CB messages. | N/A; no cell broadcast in ACeS. |
| HPLMN Search Period | Time between periodic searches for home PLMN. | Identical to GSM, but is used to search for HPSMN. |
| Phase ID | Identifies SIM as phase 1 or 2. | ACeS phase ID. |
| PUCT | Price per unit & currency table. | Separate from GSM. |
| Service Provider Name | Service Provider Name | Identical to GSM. |
| Admin data | Administrative data. | Identical to GSM. |
| *HPLMN Indicator | N/A - ACeS only. | HPLMN is Satellite or GSM. |
| *PSMN Selector | N/A - ACeS only. | Home PSMN. |
| *Beam Pair LAI List | N/A - ACeS only. | Valid beam pair LACs for current LA. |
| *Op Mode | N/A - ACeS only. | Mode: TO, TP, SO, SP. |

It will be noted that the configuration of elementary files with common or compatible information contents may vary from application to application. For example, most of the elementary files described above are used in both the ACeS type satellite cellular telecommunications system and the GSM type terrestrial cellular telecommunications system and include identical or equivalent information. These elementary files comprise the common portion 50 of the communications standard required subscription information for at least these telecommunications systems. Those elementary files (identified by an asterisk) which are not compatible and/or are needed for use solely in one or the other of the ACeS type satellite cellular telecommunications system or the GSM type terrestrial cellular telecommunications system, however, comprise the uncommon portion 52 of the communications standard required subscription information. Default information for these elementary files (for each supported telecommunications system) is stored in the uncommon portion 52' of the data storage device 60 for the mobile station 26", and is then made available for mobile station access and use in those instances where the inserted SIM card 46 fails to include the communications standard required subscription information for the desired telecommunications system. Alternatively, or in addition, file space is reserved in the uncommon portion 52' of the data storage device 60 and the subscriber is allowed to input the particular information needed for the uncommon portion 52'.

Figure 4B:
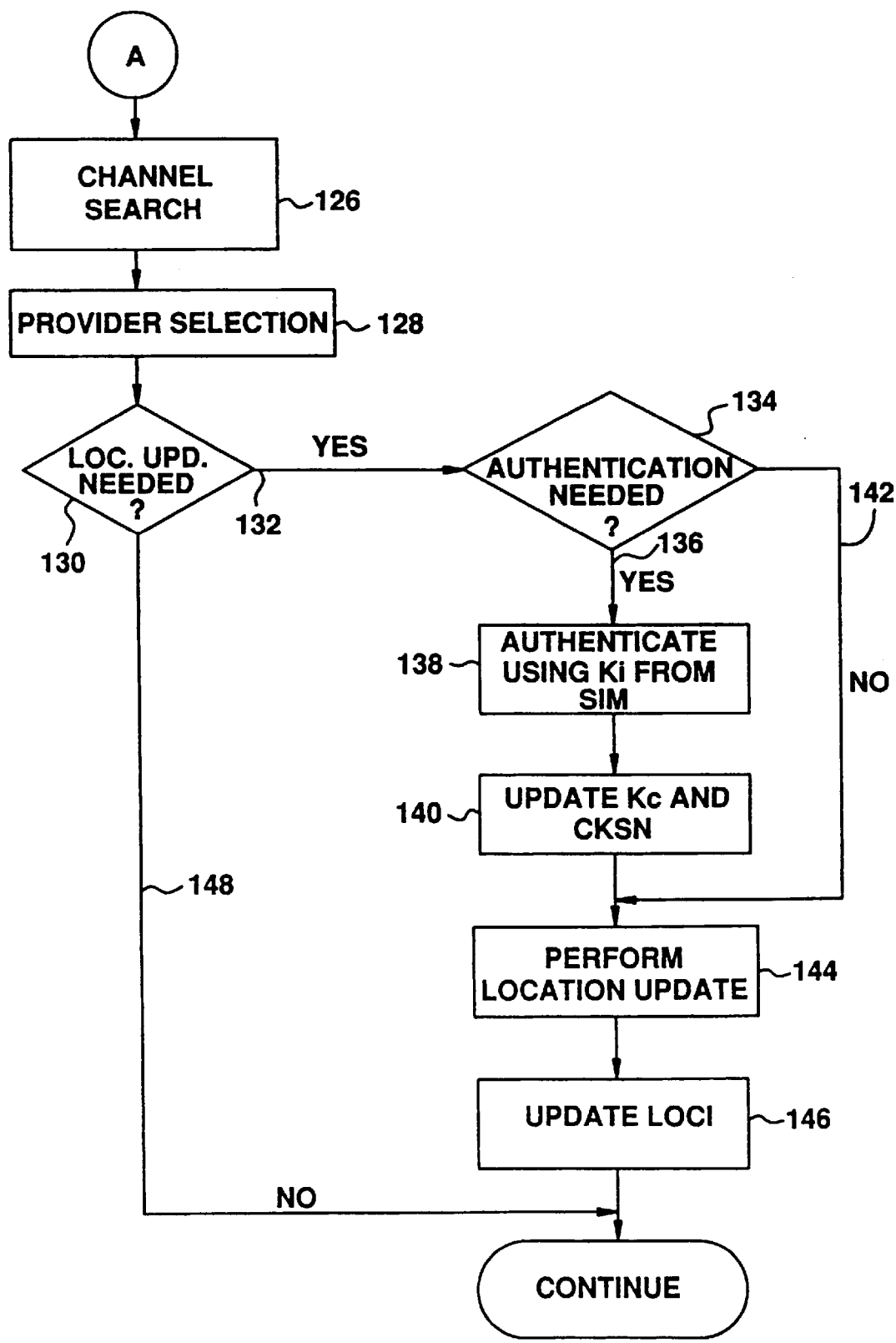

Reference is now made to FIGS. 4A and 4B wherein there is shown a flow diagram illustrating operation of the mobile station 26". In step 100, the mobile station identifies which one of several available telecommunications systems has been chosen for operation. In step 102, the directory on the SIM card corresponding to the chosen telecommunications system is selected. In decision step 104, a determination is made as to whether the selected directory is present. If yes (flow 106), operation of the mobile station continues (step 108) in a conventional manner well known to those skilled in the art utilizing the communications standard required subscription information stored on the SIM card. If no (flow 110), the mobile station reads the international mobile subscriber identity (IMSI) number from the SIM card in step 112. In decision step 114, a determination is made as to whether the read IMSI number matches an IMSI number previously stored in the data storage device of the mobile station. This step essentially tests for whether the subscriber currently using the mobile station is the same as the subscriber who most recently used the mobile station in the past. If the IMSI numbers do not match (flow 116), this implies that the subscriber currently using the mobile station is a new subscriber, and that the location information stored in the data storage device of the mobile station is incorrect. The stored location information is then erased in step 118 forcing the mobile station to re-register (i.e., perform a location update, see below) with the chosen telecommunications system. The stored values for a certain one or ones of the included elementary fields (such as the cipher key and cipher key sequence number) are then erased (step 120) to be subsequently updated as a result of a subsequent authentication (again, see below). The subscriber is then given an opportunity in step 122 to alter some of the stored operational data, for example, the selection of a satellite or terrestrial cellular telecommunications system provider and identify a list of forbidden providers.

Thereafter, or if the IMSI numbers did match (flow 124) in step 114, the mobile station performs a channel search and selects a provider for the chosen telecommunications system (steps 126 and 128). A determination is then made in step 130 as to whether a location update is needed. This depends in part on whether the location information had previously been erased in step 118. If a location update is needed (flow 132), a determination is made in step 134 as to whether authentication is also needed. It is preferable to require authentication as the authentication process is performed between the telecommunications system and the SIM card (not the mobile station), thus preventing operation of the mobile station without the presence of a SIM card. If authentication is needed (flow 136), the subscriber authentication key is extracted from the SIM card and used to perform the authentication process (step 138). The cipher key and cipher key sequence number are then updated for storage in the data storage device 60 or on the SIM card in step 140. Preferably, no such data is stored in the data storage device 60 in order to preclude performance of the authentication process absent the presence of a SIM card.

Thereafter, or if authentication is not needed (flow 142) in step 136, the mobile station performs a location update operation in step 144. The location information for the mobile station is then updated for storage on the SIM card in step 146. Thereafter, or if no location update is needed (flow 148) in step 130, conventional mobile station operation continues in a manner well known to those skilled in the art using the communications standard required subscription information stored on the SIM card 46 or in the data storage device 60, as necessary.

Although one or more embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A multi-mode mobile station supporting communications operation in at least a first and a second type of cellular telecommunications system, comprising:

a subscriber identity module (SIM) card, the SIM card storing communications standard required subscription information for the first type of cellular telecommunications system but not the second type of cellular telecommunications system, the stored communications standard required subscription information including, however, some information shared in common by many different types of cellular telecommunications systems including the second type of cellular telecommunications system;

a memory storing some uncommon communications standard required subscription information unique to each of the first and the second types of cellular telecommunications systems that has not been downloaded from the SIM card; and a processor connected to the slot and memory, the processor extracting the common communications standard required subscription information from the SIM card for use with the uncommon communications standard required subscription information taken from the memory to engage in cellular communications in the second type of cellular telecommunications system.

2. The multi-mode mobile station as in claim 1 wherein the SIM card stored communications standard required subscription information is stored in a different directory for each subscripted to cellular telecommunications system, the SIM card containing at least one such directory.

3. The multi-mode mobile station as in claim 1 wherein the processor extracts the stored communications standard required subscription information from the SIM card to engage in cellular communications in the first type of cellular telecommunications system.

4. The multi-mode mobile station as in claim 1 wherein the first type of cellular telecommunications system comprises a terrestrial cellular system.

5. The multi-mode mobile station as in claim 4 wherein the terrestrial cellular system comprises a Global System for Mobile (GSM) communications system.

6. The multi-mode mobile station as in claim 1 wherein the second type of cellular telecommunications system comprises a satellite cellular system.

7. The multi-mode mobile station as in claim 6 wherein the satellite cellular system comprises an Asia Cellular Satellite (ACeS) system.

8. A method for multi-mode mobile station operation, wherein the mobile station supports communications operation in a plurality of types of cellular telecommunications systems, and internally stores uncommon communications standard required subscription information that is unique to each one of the plurality of systems, the method comprising the steps of:

responsive to a selection for operation of a certain one of the plurality of types of cellular telecommunications systems, checking to see if communications standard required subscription information for that certain system is stored on an inserted subscriber identity module (SIM) card; and if so:

extracting the stored communications standard required subscription information from the SIM card for use in engaging in cellular communications over that certain system; else if not:

extracting stored communications standard required subscription information shared in common between the plurality of systems from the SIM card; and using the extracted common communications standard required subscription information along with the internally stored uncommon communications standard required subscription information, which is not from the SIM card, for that certain system in engaging in cellular communications over that certain system.

9. The method as in claim 8 wherein the plurality of types of cellular telecommunications systems include both terrestrial and satellite cellular systems.

10. A multi-mode mobile station supporting communications operation in at least a first and a second type of cellular telecommunications system, comprising:

a slot for receiving a removable subscriber identity module (SIM) card, the SIM card storing communications standard required subscription information for the first type of cellular telecommunications system but not the second type of cellular telecommunications system, the stored communications standard required subscription information including, however, some information shared in common by many different types of cellular telecommunications systems including the second type of cellular telecommunications system;

a memory within the mobile station storing some uncommon communications standard required subscription information unique to each of the first and the second types of cellular telecommunications systems; and a processor connected to the slot and memory, the processor extracting the common communications standard required subscription information from the inserted SIM card for use with the uncommon communications standard required subscription information taken from the memory to engage in cellular communications in the second type of cellular telecommunications system.

\* \* \* \* \*

UNITED STATES PATENT AND TRADEMARK OFFICE
CERTIFICATE OF CORRECTION

PATENT NO : 5,884,168
DATED : March 16, 1999
INVENTOR(S): Kolev et al.

It is certified that error appears in the above-identified patent and that said Letters Patent are hereby corrected as shown below:

Column 11, line 15  Delete "else"
Insert --or--

Signed and Sealed this

Eighth Day of May, 2001

Attest:

NICHOLAS P. GODICI

*Attesting Officer*  *Acting Director of the United States Patent and Trademark Office*